Figure 4:
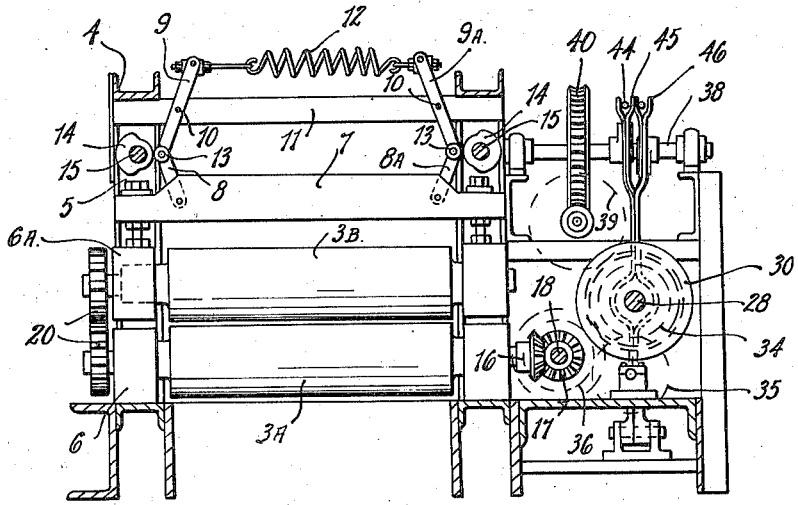

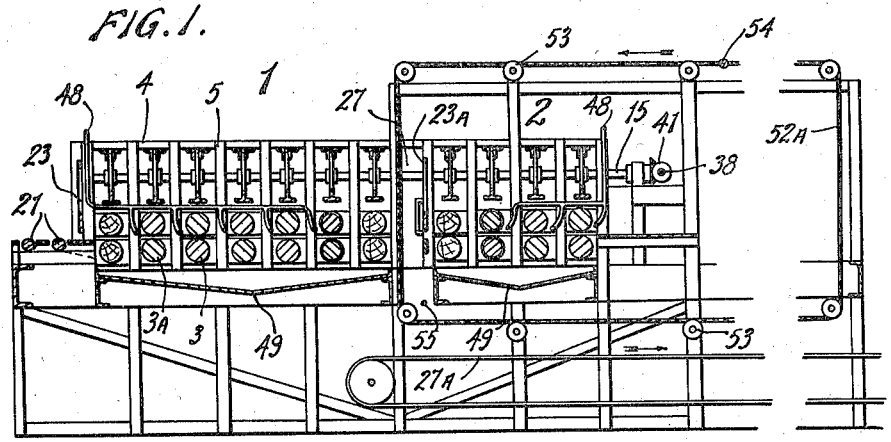
Fig. 1.
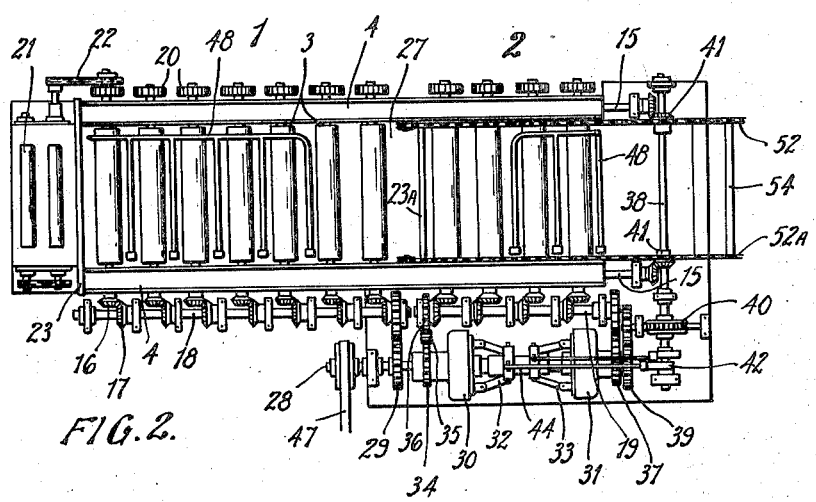
Fig. 2.
Fig. 3.

Aug. 2, 1938.  R. H. MILBURN ET AL  2,125,800
METHOD OF AND APPARATUS FOR THE TREATMENT OF FLAX AND THE LIKE FIBERS
Filed Feb. 23, 1937  2 Sheets-Sheet 2

R. H. Milburn &
H. C. Milburn,
INVENTORS

By Glascock Downing & Seebold
ATTYS.

Patented Aug. 2, 1938

2,125,800

UNITED STATES PATENT OFFICE 2,125,800

METHOD OF AND APPARATUS FOR THE TREATMENT OF FLAX AND THE LIKE FIBERS

Richard Howse Milburn, Parnell, and Herbert Granville Milburn, Remuera, Auckland, New Zealand Application February 23, 1937, Serial No. 127,252
In New Zealand March 23, 1936

7 Claims. (Cl. 19—32)

This invention relates to apparatus for the decortication of flax and the like fiber contained in the leaves of the plants Phormium tenax (New Zealand flax,) sisal, abaca and the like, the objects of the invention being the provision of an improved apparatus which will decorticate and remove the chlorophyll without bruising and weakening the fiber, will tend to minimize discoloration of the fiber, will minimize wastage and enable greater uniformity in the fiber produced.

It is known to pass flax leaves through rollers under pressure for decorticating purposes, but there are numerous difficulties in the use of such apparatus which have made its use unsatisfactory, one of the troubles encountered being a tendency for the fiber to wind itself around the rollers, causing ineffective treatment of the thinner portions of the leaf and general difficulties in the effective control of the operation of the rollers.

The difficulties previously encountered with roller decorticating machines have been such as to render them a non-commercial article, also the present "stripper" machines working on the beater principle are well known to have numerous very bad features, such as high percentage of waste fiber, damage to and discoloration of the fiber and inability to treat the whole of a leaf resulting in such portion of the leaf becoming waste.

By our invention, the disadvantages of the known roller and stripper machines are eliminated, a roller type machine being devised which operates on a novel principle and achieves a new method of treatment.

According to the invention, our method of treating the leaves so as to decorticate same and leave the flax fiber produced free of the vegetable matter and in good condition broadly comprises admitting the leaves at regular intervals to a first series of rollers, crushing the leaves with the exception of their butt or leading ends in said first series of rollers, admitting the butt or leading ends of said leaves to a second series of rollers without treating same in transit therethrough, reversing the direction of travel of the said butt or leading ends of the said leaves and crushing same while returning through the second series of rollers, washing away the cholrophyll between the rollers of both series of rollers and discharging the fiber produced from between the two series of rollers in either straight or folded form.

Broadly the apparatus of the invention comprises conveyor and shutter means for feeding the leaves at regular intervals into a first series of rollers, means for applying pressure between each successive pair of rollers in turn when the butt ends of the leaves have passed therethrough resulting in the whole of the said leaves receiving treatment with the exception of their butt or leading ends, a second series of rollers through which the butt or leading ends of the leaves are adapted to pass, means for reversing the direction of travel of said second series of rollers, means for applying pressure between each successive pair of rollers in turn so as to treat the butt or leading ends of said leaves as they return through said rollers, means for washing away the chlorophyll between the pairs of rollers of both series of rollers and means for discharging the fiber produced from between the two series of rollers in either straight or folded form.

In describing the invention, reference will be made to the accompanying drawings in which:—

Figure 5:
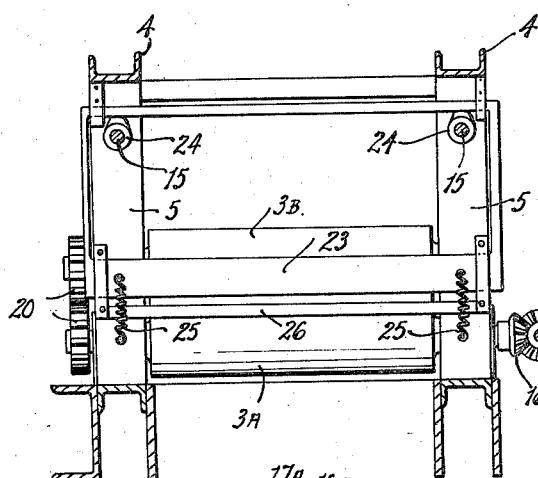
Figure 6:
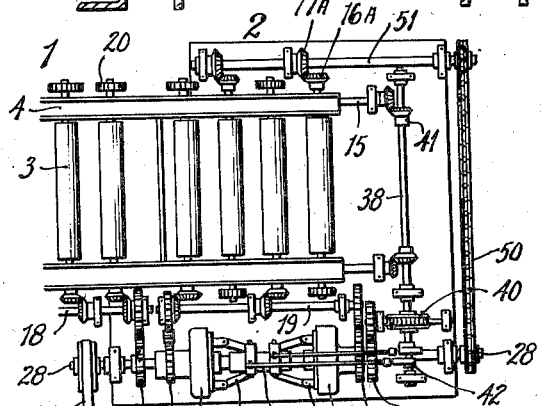

Fig. 1 shows a sectional elevation of the machine,

Fig. 2 shows a plan view thereof (with toggles and overhead gear not shown so as to clearly indicate the rollers), Fig. 3 shows an elevation of the various shafts and their gearing arrangement, Fig. 4 shows an enlarged sectional end elevation between pairs of rollers, Fig. 5 shows an enlarged sectional end elevation in the vicinity of one of the shutters, and Fig. 6 shows a partial plan view of the machine to indicate a modified arrangement of drive for the second series of rollers.

In the invention, there are two series of rollers which will be called the first series 1 and second series 2, the rollers 3 of which are mounted in pairs between side frames 4 in which there are vertical guides 5 for carrying the bearings of which the lower bearings 6 (see Fig. 4) are rigidly mounted so that the lower rollers 3A are incapable of vertical movement, the upper rollers 3B being journalled in upper bearings 6A capable of vertical movements in the guides 5, such bearings 6A being connected to crosshead members 7 to which are coupled toggle levers 8 and 8A which at their upper free links 9 and 9A are pivoted at 10 to a lateral frame member 11, said links 9 and 9A being coupled by tension springs 12 and each having rollers 13 for engagement with cams 14 mounted on cam shafts 15 which extend along each side frame 4.

To the lower rollers 3A, bevel pinions 16 are secured in mesh with driving bevels 17 on the side shafts 18 and 19 of the first and second roller series 1 and 2 respectively (see Fig. 2) the upper and lower rollers 3A and 3B being connected by spur wheels 20 with teeth of form suited to permit vertical travel of the upper rollers 3B without coming out of mesh, the maximum vertical travel of the upper rollers 3B being only a small portion of an inch.

At the "feed in" end of the machine a feed-in conveyor 21 is disposed (of greater length than indicated in the drawings) said conveyor 21 receiving a suitable drive 22 from the first roller set (see Fig. 2) a shutter 23 being disposed just in front of this first roller set (see Fig. 5) adapted to be raised and lowered by the respective actions of cams 24 on the cam shafts 15 and tension springs 25 adapted to draw the shutter 23 downward, the shutter 23 being adapted to close down on a fixed platform or bar 26.

A gripping member 23A of similar construction and working arrangement to shutter 23 is disposed in front of the first roller set of the second series 2, the space 27 between the first and second series 1 and 2 being the fiber discharge, below which there is a discharge conveyor 27A to carry the fiber away from the machine.

The side shaft 18 drives the rollers 3 of the first series 1 continuously in one direction only, to carry the leaves from the feed-in conveyor 21 to the discharge space 27, this side shaft 18 receiving its drive from main shaft 28 by means of a pair of spurwheels 29.

The side shaft 19 drives the rollers 3 of the second series 2, but as these rollers 3 have to be reversible, special mechanism is applied to get this action and to obtain synchronization of such action with the operation of the other portions of the machine.

On the main shaft 28 there are two friction clutches, the drums 30 and 31 of which are freely rotatable on the said shaft 28 and their engaging mechanisms 32 and 33 secured to the said shaft 28, the drum 30 having a spur wheel 34 secured thereto in mesh with an independently mounted idler pinion 35 which in turn is in mesh with a spur wheel 36 on one end of the side shaft 19.

At the other end of the side shaft 19 a drive is received by a pair of spur wheels 37 one of which is mounted on clutch drum 31, this combination of gearing being such that the drive received by side shaft 19 from clutch drum 30 will be the reverse to that received from drum 31.

The main shaft 28 also transmits a reduced speed drive to a lateral shaft 38 by way of spurwheels 39 and worm gearing 40 (see Fig. 3) this reduced speed drive being transmitted to the two cam shafts 15 by pairs of bevel pinions 41.

On the lateral shaft 38 there are cams 42 for actuating links 43 which contact same, said links being connected by rods 44 to actuating levers 45 and 46, the former engaging the clutch engaging mechanism 32 and the latter engaging clutch mechanism 33.

The main shaft 28 receives any suitable drive 47 from a source of power and between some of the pairs of rollers 3 there are water spraying pipes 48, collecting trays 49 being disposed below the roller series 1 and 2.

With the drive arrangements of Figs. 2 and 3 the four pairs of rollers 3 of the second series 2 would rotate in like direction and reverse together, being all driven via the side shaft 19 but as the rollers 3 will rotate at high speed, to reduce the reversible load two only of the rollers may be adapted for reversal while the other two rotate constantly in the one direction.

In the modified arrangement of drive as shown in Fig. 6, the first and third pair of rollers are reversible and the second and fourth pair rotated constantly in an inward direction towards the discharge space 27, the main shaft 28 being extended to give a suitable end drive 50 to an off-side shaft 51 which engages by bevel pinions 16A and 17A the lower roller 3A of the said second and fourth pairs.

The apparatus described will effect the desired treatment of the leaves to obtain the fiber but as indicated by the cross-hatching of the rollers 3 in Fig. 1 the rollers are not intended to be all crushing rollers.

The first pair of rollers 3 from the feed in conveyor 21 would be feeding rollers and of a light construction such as wood, the next four pairs of rollers 3 would be crushing rollers and made of hard material such as steel, the next pair would be drying rollers, made of light construction and coated with suitable flexible material such as rubber or like and the final pair of rollers in the first series 1 would also be feeding rollers.

In the second series of rollers commencing at the discharge space 27, the first pair of rollers would be feeding rollers, the second pair drying rollers and the third and fourth pair crushing rollers, this specified arrangement not being essential, and in fact there may be more or less rollers in the two series 1 and 2 according to the characteristics of the particular leaf the machine is to treat.

To ensure a definite feed-in of the thick butt ends of the leaves, the feed rollers may be fluted, having longitudinal grooves of spiral form cut therein.

In discharging the treated fiber from the machine, it is to be understood that at the time of discharge, in the longest leaves about half of the length of fiber will be in the first series of rollers 1 while the leading half is in the second series, and therefore, as both roller series will simultaneously discharge the flax fiber into discharge space 27, such fiber would be folded on being carried away by discharge conveyor 27A.

It is not desirable to have the fold in the fiber in all cases, as for instance when subsequent artificial drying is to be effected, and accordingly, to provide for this a sweeper bar mechanism is applied.

This comprises two continuous conveyor chains 52 and 52A mounted on sheaves 53 and adapted to pass down the discharge space 27 along side the side frames 4 and then horizontally above the discharge conveyor 27A, a sweeper bar or bars 54 passing across between these chains 52 and 52A, so as to pass across the horizontal line of travel of the leaf, a guide bar 55 also being disposed laterally across the bottom portion of the discharge space 27.

The upper rollers 3B of the machine will be sprung (not shown) at their bearings 6A in relation to their cross head members 7 in known manner as associated with toggle operated rollers, so as to allow a degree of give or yield between pairs of rollers 3 when contacting.

In operation, the machine is adapted to make use of the natural stiffness of the butt end of the leaf, this stiffness being such that a foot or so of the butt end of leaf can readily be held out in cantilever manner, whereas with the tip end of the leaf, same is too limp to be held out horizontally.

Therefore, the untreated butt end of the leaf can be passed across from pair to pair of rollers 3 and also across the wider discharge space 27 without support means between the pairs of rollers 3 although obviously such support means could be readily applied if desired.

Furthermore, by leaving the butt end of the leaf untreated until the final stages of treatment in the machine, the fiber is all held to the butt end and thereby prevented from tending to wrap around the rollers.

It will be understood that the various gear trains, shafts, cams and the like are all timed to give a synchronized cycle of operation, the conveyor chains 52 and 52A and the sweeper bar or bars 54 also being driven to synchronize with the machine operation by receiving some drive (not shown) associated with the machine drive.

The leaves of New Zealand flax (*Phormium tenax*) averaging about seven feet in length are placed on to the feed-in conveyor 21 with their butt ends towards the shutter 23 which they will abut due to the action of said conveyor 21.

The shutter 23 will be raised by its cams 24 permitting the conveyor 21 to feed the leaves through the first pair of rollers 3 and into the second pair of rollers at which stage the toggles 8 and 8A of said first pair of rollers will depress the upper roller 3B and this pair being feed rollers, they will take care of the further feed-through of the leaf in the first series 1.

Similarly, the other pairs of toggles will be operated successively by their cams 14 to depress their respective upper rollers 3B, so that the butt end of the leaf will pass from the first series 1 untreated whilst the remaining portion will be crushed by the four pairs of crushing rollers 3 while being sprayed with water from spray pipes 48 which carries the removed chlorophyll into the collecting trays 49, the leaf in transit being partially dried by the drying rollers.

The gripping member 23A will be in an open position so that the butt end of the leaf passes straight on into the second roller series 2, the butt end passing through the four pairs of rollers of this series until it has passed the fourth pair.

It is to be understood that with the upper rollers 3B in raised position, the gap between pairs of rollers will only be about one quarter inch, so that there is a leaf supporting and feeding tendency of the rollers although they are not actually contacting each other, it being also understood that at this stage of the cycle of operation the rollers of the second series 2 will be receiving their drive from the side shaft 19 (see Fig. 3) via gears 37 and clutch drum 31 and furthermore in the longest leaves about half of the leaf length will be in roller series 1 and the other half length of leaf in the second roller series 2.

The cams 42 on the lateral shaft 38 now move links 43, rods 44 and actuating levers 45 and 46 so that the clutch mechanism 33 of drum 31 disengages and clutch mechanism 32 of drum 30 engages, causing the drive to the side shaft 19 via gears 34, 35 and 36 to take effect so that the shaft 19 rotates in reverse direction and the rollers of the second series 2 are reversed to rotate towards the discharge space 27, the toggles of this series all operating to depress their upper rollers 3B so that the butt ends are crushed and partially dried.

In the event of the sweeper bar mechanism not being applied to the machine, the fiber would now be discharged down into the discharge space 27 in a folded state in the case of the longer leaves and straight in the case of the short leaves due to the two series 1 and 2 both delivering their portions of leaf simultaneously, the fiber passing down on to the conveyor 27A and being carried away thereby, the gripping member 23A not being required under these conditions, it being understood that in the case of a short leaf, the major portion of same would be within the second series 2 so that the portion of leaf in the first series 1 would be discharged quickly without a fold being formed.

It being desired to deliver the fiber in straight unfolded lengths, the operation of discharge would be slightly modified, in that as the fiber is being delivered, the sweeper bar 54 on chains 52 and 52A would be timed to pass down the discharge space 27 to engage the fiber at its fold, and as the fiber is leaving the first pair of rollers of the second series 2, the gripping member 23A would close down on to the fixed platform or bar 26 thereby gripping the butt therebetween and holding same for a period which would permit the portion of fiber in the first series to be discharged first and the fold straightened out around the guide bar 55 and along the conveyor 27A, the shutter 23A then lifting to permit the complete length of fiber to pass down on to said conveyor 27A to be carried away thereby.

With the modified drive of series 2 as shown in Fig. 6, as only the first and third pairs of rollers are reversible in rotation, the timing of the cams 14 operating the upper roller 3B of the first and third pairs may be modified so as to cause gripping of the leaf from the entry thereof to the second series, to discharge therefrom, this gripping action counteracting the action of the second and fourth pairs of rollers which are rotating continuously towards the discharge space 27, and in respect of this modified arrangement of rollers in series 2, the pairs of rollers may be varied from the arrangement indicated in Fig. 1, so that the first and third pair of rollers become feeding rollers and the second and fourth pair, crushing rollers.

Although the cycle of operation takes some length of time to describe, it will be understood that the complete cycle will only occupy a fraction of a minute, fresh untreated leaves having entered the first roller series at the stage where the previous leaves are being discharged in fiber form.

We claim:

1. A method of treating leaves of *Phormium tenax* and the like so as to decorticate the same and leave the fiber comprising, admitting the leaves at regular intervals to a first series of rollers, crushing the leaves with the exception of their butt ends in said first series of rollers, admitting the butt ends of said leaves to a second series of rollers without treating same in transit therethrough, reversing the direction of travel of said butt ends of the said leaves and crushing same while returning through the second series of rollers, washing away the chlorophyll between the rollers of both series of rollers, and discharging the fiber produced from between the two series of rollers in the desired form.

2. Apparatus for treating leaves of *Phormium tenax* and the like so as to decorticate the same and leave the fiber, compriisng a first series of rollers for effecting decorticating treatment of the leaves with the exception of their butt ends, driving means for said rollers, a second series of rollers through which the butt ends of the leaves are adapted to first freely pass and which butt ends are adapted to return and then receive decorticating treatment, and driving means for effecting alternate reverse rotation of said rollers, means for washing away chlorophyll between the rollers of both of said series of rollers, and discharge means between said first and second series of rollers for delivering the fiber produced.

3. Apparatus for treating leaves of *Phormium tenax* and the like so as to decorticate the same and leave the fiber, comprising conveyor and shutter means for feeding the leaves at regular intervals into a first series of rollers, means for applying pressure between each successive pair of rollers in turn when the butt ends of the leaves have passed therethrough, a second series of rollers through which the butt ends of the leaves are adapted to pass, means for reversing the direction of travel of said second series of rollers, means for applying pressure between pairs of rollers of said second series so as to treat the butt ends of said leaves as they return through said rollers, means for washing away the chlorophyll between the rollers of both series of rollers and means for discharging the fiber produced from between the two series of rollers.

4. Apparatus as claimed in claim 3, wherein the means for applying pressure between the pairs of rollers in the two series of rollers comprise pairs of toggles connected to the upper rollers of the pairs of rollers by means of crossheads and the bearings of said upper rollers, said toggles being coupled by spring means and engaged by cams on cam shafts extending along the machine substantially as described.

5. Apparatus as claimed in claim 3 wherein the means for reversing the direction of travel of rollers in the second series of rollers comprises two clutches on the main drive shaft, gearing connecting each of said clutches to the side shaft which drives the rollers of said second series and cam actuated mechanism for effecting engagement of either one of said clutches substantially as described.

6. Apparatus as claimed in claim 3 wherein the means for discharging the fiber produced from between the two series of rollers in straight form comprises a discharge conveyor disposed below the discharge space between the two series of rollers, a gripping member disposed in front of the first pair of rollers of the second series, platform or bar means down on to which said gripping member is adapted to close, oppositely disposed conveyor chains adapted to pass down the discharge space and horizontally above said discharge conveyor, sweeper bars extending between said conveyor chains and a guide bar extending lateraly across the bottom portion of the discharge space, substantially as described.

7. Apparatus as claimed in claim 3, wherein the means for driving the rollers in the second series of rollers comprises, a pair of clutches on the main drive shaft, gearing connecting one of said clutches to the driving means for some of said rollers, and gearing connecting the other of said clutches to the driving means for the other rollers to effect a reversal of travel with respect to said first rollers of said second series of rollers, and a cam actuated mechanism for effecting alternate engagement of said clutches to alternately drive the rollers connected to said clutches in opposite directions.

RICHARD HOWSE MILBURN.
HERBERT GRANVILLE MILBURN.